United States Patent Office 2,782,144
Patented Feb. 19, 1957

2,782,144

TREATING SILICA-METAL OXIDE COMPOSITES AND CRACKING PROCESS

William A. Pardee, Fox Chapel, Pa., assignor to Gulf Research & Development Company, Pittsburgh, Pa., a corporation of Delaware No Drawing. Application August 1, 1950, Serial No. 177,139

3 Claims. (Cl. 196—52)

This invention relates to a process of treating calcined composites consisting of silica gel composited with metal oxides to accomplish desirable alteration of the surface characteristics of the composites. The invention also relates to a process of cracking hydrocarbons in which a treated composite is employed as the catalyst.

Synthetic siliceous composites composed of silica gel and a metal oxide or metal oxides have been employed or proposed for use as catalysts in the petroleum field in processes such as catalytic cracking, polymerization, hydrogen exchange reactions and the like, and as catalyst supports for active catalytic metals and metal oxides such as chromium oxide, nickel oxide and molybdenum oxide. These composites have also been employed with advantage as adsorbents for vapor phase materials, as dehydrating agents, and as agents in other procedures where their excellent physical strength and surface characteristics make them useful.

The composites usually contain a predominant amount of silica gel combined with one or more metal oxides such as alumina, magnesia, zirconia, titania, boria, and tungstia. The composites can be prepared by a variety of methods. One method comprises first preparing a silica hydrogel by any suitable procedure such as, for example, treating an alkali metal silicate with an acidic material such as hydrochloric acid, washing the resulting gel free of alkali metal, precipitating the other oxide or oxides in the form of a gel or gelatinous precipitate in the presence of the silica hydrogel, drying and calcining. Thus, to prepare a silica-alumina contact material by this method, a solution of a soluble aluminum salt such as aluminum nitrate is added to the washed silica hydrogel and then the resulting mixture is adjusted to a suitable pH for precipitation of an alumina gel or gelatinous precipitate by addition of an alkaline material, preferably ammonium hydroxide. Thereafter excess alkalinity is removed, and the mixed gel is dried and calcined.

Another method of preparing these mixed oxide composites comprises co-precipitating the silica and the other oxide or oxides in the form of either a hydrogel or a gelatinous precipitate by mixing a soluble silica composition and solutions of soluble salts of the metals of the other oxides under pH conditions adapted to cause the formation of the desired hydrogel or gelatinous precipitate. In this connection it should be noted that since there is no clear line of distinction between compositions referred to as hydrogels and those termed gelatinous precipitates, and these materials yield closely similar final products in any case, both are referred to generically as gels containing water of formation or, shortly, undried gels. In this co-precipitation method of preparation, any alkali metals present in the gel as initially formed can be removed from the wet gel which is then dried and calcined. Alternatively, the gel containing an alkali metal can be dried and thereafter the alkali metal can be removed by base exchange, for example, with a suitable ammonium salt. The resulting product is then again dried, and is calcined to fix its physical and chemical properties.

Mixed oxide composites of this general class can also be prepared by first making silica gel as described above, drying, calcining, and depositing the other oxide or oxides on the silica gel. This can be done by soaking the dried silica gel in a solution of a salt of the metal of the desired oxide, forming the oxide in situ by treating the impregnated silica gel with a suitable chemical, and calcining or, if the salt is decomposable by heat, the decomposition of the salt and the fixing of the properties of the composite can be accomplished in a single calcination.

The principal commercial use of such composites at the present time is as catalysts in catalytic cracking processes wherein higher boiling oils such as gas oil, fuel oil, and heavier fractions of petroleum are converted to gasoline and lighter hydrocarbons with the concomitant deposition of a carbonaceous material, usually termed coke, on the catalyst. In these processes the oil is contacted with the catalyst at temperatures of about 700° to about 1100° F., preferably about 800° to about 1000° F., at about atmospheric or slightly higher pressures. Typical commercial catalytic cracking processes include fixed bed processes wherein the catalyst in the form of small pellets or granules is disposed in a stationary bed; moving bed processes wherein the catalyst is caused to move downwardly through the reactor in a continuous bed; and fluid processes wherein the catalyst in the form of fine particles is usually disposed in a fluid bed to which catalyst is continuously added and from which catalyst is continuously removed. Each process involves the regeneration of the catalyst by burning off the coke, this regeneration being accomplished on the catalyst in situ in fixed bed processes and in a separate regenerator in the moving bed and fluid processes.

In view of the desirability of providing composite gels having selected surface characteristics, methods of preparing such gels have been devised whereby the final products have the desired surface characteristics. Thus, it is known that the pH conditions existing at the time of precipitation of the gel have an effect on the surface area and average pore diameter of the final dried and calcined product. It is also known that the surface characteristics of a final gel can be affected by washing the undried gel with an aqueous solution of selected pH value, and washing with water having a selected temperature.

These methods of producing silica-metal oxide composites of varying surface characteristics have the disadvantage that they can only be applied to the gel before removing the water of formation. Accordingly, once a quantity of the material is prepared having selected surface characteristics and it is desired to alter the surface characteristics, these methods offer no solution to the problem.

The present invention is concerned with a process for the treatment of calcined silica-metal oxide composites to alter the surface characteristics in the direction of increased average pore diameter and lower surface area. The treatment is effective also to change the catalytic properties of the composites, presumably one result of the alteration of the surface characteristics. Thus, by practice of the process of the invention, it is possible to alter the surface characteristics and catalytic properties of a composite previously considered a finished material and adapt the composite for a desired purpose. For example, a composite can be prepared having a maximum surface area and narrow pores and yet be employed for a variety of uses since portions of it may be so treated as to have different characteristics.

I have discovered in accordance with the invention that by immersing a calcined silica-metal oxide composite in an aqueous solution of an ammonium hydroxide and then removing the hydroxide from the surface of the composite, the average diameter of the pores of the composite is increased, the surface area decreased, and the catalytic activity of the composite altered. The ammonium hydroxide can be amomnium hydroxide itself or a substituted ammonium hydroxide. The process is carried out in accordance with a preferred manner of proceeding by immersing the calcined composite in an aqueous solution of ammonium hydroxide, permitting the composite to remain in contact with the solution for a period of time adapted to cause the desired change in the surface characteristics of the gel, separating the gel from the solution and then removing the ammonium hydroxide from the surface of the gel.

I have found that effective results can be obtained at ordinary atmospheric temperature and therefore such temperature is preferably used. However, higher temperatures can be employed, such as temperatures up to about 325° F., if it is desired to shorten the time of treatment. Also, by the use of higher temperatures the same effect can be obtained with a weak solution of an ammonium hydroxide as with a strong solution at atmospheric temperature. In carrying out the process, ammonium hydroxide solutions of various concentrations can be used. When using a strong solution, the desired results can be obtained in a shorter period of time than when more dilute solutions are employed.

A modification of the process of the invention involves first intimately contacting the surface of the composite with dry ammonia gas and then immersing the composite in an aqueous solution of an ammonium hydroxide. This is preferably accomplished by evacuating the composite and then, while the pores are substantially free of other gases, causing the dry amomnia gas to enter the pores. When proceeding in this manner the later contact of substantially the entire pore surface with an ammonium hydroxide is assured.

The removal of ammonium hydroxide from the composite following the ammonium hydroxide treatment can be accomplished in various ways. It is important that once the surface characteristics of the composite have been altered to the desired extent, no ammonium hydroxide be permitted to remain in contact with the composite since the hydroxide will continue to affect the surface characteristics. The removal can be accomplished by washing the composite several times with water until no ammonia appears in the wash water. The resulting wet material is then dried, preferably under vacuum, and may be subjected to a final calcination. The removal of the ammonium hydroxide can also be accomplished by drying the composite containing the ammonium hydroxide solution at a relatively low temperature, for example, a temperature of about 212° to about 350° F., and then calcining the dry composite, if desired. Calcination if carried out is effectively accomplished by heating the composite at a temperature of about 700° to 1300° F. for a period of one or more hours; for example, about 2 to 20 hours.

I have discovered that especially advantageous results from the standpoint of the cracking activity of the composites are obtained by subjecting a composite after the ammonium hydroxide treatment to calcination at a temperature higher than the conventional calcination temperatures referred to above; for example, a temperature in the range of about 1300° to 1500° F. and preferably about 1400° F. The effect of this high temperature calcination is noticed especially when the composite is a silica-alumina cracking catalyst.

In order that the invention may be understood more fully, reference should be had to the following specific examples.

EXAMPLE I

In this example a silica-alumina composite employed commercially as a cracking catalyst was treated in accordance with the process of the invention. This composite had been prepared by a process comprising co-precipitating silica and alumina gels or gelatinous precipitates by reacting sodium silicate in the form of a commercial water glass solution, sodium aluminate and a suitable inorganic acid such as sulfuric acid, drying the resulting composite gel, base exchanging the dried composite gel with an ammonium salt such as ammonium chloride to remove sodium, pelleting, drying and calcining at a temperature of about 1000° F. to produce final calcined pellets in the form of ⅛ inch by ⅛ inch cylinders. The composite contained about 12 percent by weight alumina. This composite was treated by placing the pelleted composite in a vessel, evacuating the vessel and passing ammonia gas over the composite. After a short time, the vacuum system was cut off and the pressure allowed to increase to slightly above atmospheric by continuing flow of ammonia. Thereafter, the treatment with flowing ammonia gas was continued for 30 minutes at a pressure slightly above atmospheric. The treatment with amomnia gas was then discontinued and a solution of ammonium hydroxide containing about 28 percent $NH_3$ was poured into the vessel in an amount sufficient to cover the composite. The composite was maintained immersed in the ammonium hydroxide solution for about 15 minutes and was then filtered from the excess ammonium hydroxide. The composite was then dried overnight at about 265° F. and then calcined at about 1025° F. for 2 hours.

The composite obtained as a result of this treatment was then employed as a hydrogen exchange catalyst in an operation wherein an olefinic material was passed in contact with the composite to reduce the degree of unsaturation of the material. Thus an isobutylene charge containing 99.1 percent unsaturates was passed in contact with a fixed bed of the composite at a space velocity (liquid volumes of charge per volume of catalyst per hour) of about 0.5 and an average temperature of about 850° F. for a period of about 3 hours. The product produced was collected at the intervals indicated in the following table and the percentage of olefins in each sample collected was determined. In order to evaluate the effect of the treatment with ammonium hydroxide, a similar operation was carried out utilizing the untreated catalyst composite. The results obtained are given in the following table.

Table 1

| Approximate Time Intervals of Collecting Samples | Wt. Percent Olefins in Samples from Run on Untreated Composite | Wt. Percent Olefins in Samples from Run on $NH_4OH$ Treated Composite |
| --- | --- | --- |
| 5 minutes | 14.8 | 10.9 |
| 15 minutes | 33.7 | 25.8 |
| 30 minutes | 48.5 | 37.6 |
| 60 minutes | 58.4 | 49.9 |
| 90 minutes | 67.4 | 58.8 |
| 125 minutes | 69.0 | 65.5 |
| 150 minutes | 74.0 | 69.2 |
| 180 minutes | 79.4 | 71.3 |

It will be seen from the results given in the table that the ammonium hydroxide treatment substantially increased the value of the composite for use in hydrogen exchange reactions. Thus, the product obtained after a five minute on-stream period when using the composite treated with ammonium hydroxide contained only 10.9 percent olefins whereas the product obtained after a similar period using the untreated composite contained 14.8 percent olefins. Also, the ammonium hydroxide treated composite continued to exhibit better activity throughout the entire run.

EXAMPLE II

In this example the commercial silica-alumina composite of Example I was subjected to treatment. This material, while primarily intended for use as a cracking catalyst, is also valuable as a dehydrating agent and as a catalyst base. When used as a catalyst base, its high cracking activity and small pores are frequently undesirable, as in a case where it is used as a base for a dehydrogenation catalyst such as chromia or molybdena, used in a process in which the object is to accomplish dehydrogenation to the exclusion of cracking. The total surface area of the composite before ammonia treatment was 318 square meters per gram. Three portions of this composite were treated with ammonium hydroxide in the following manner. The composite was placed in a vessel which was then evacuated to remove air from the vessel and the pores of the composite. Thereafter, an aqueous solution containing the percent by weight NH₃ indicated in Table 2 was introduced into the vessel and permitted to remain at atmospheric temperature for 15 minutes. The vessel was then opened, the solution drained from the composite, and the composite was dried in a drying oven overnight at a temperature of about 248° F. The dry material was then calcined for 16 hours at about 900° F. The effect of the ammonium hydroxide treatment on the surface area of the composite is shown in the following Table 2 in which the treated composites are referred to as composites 1, 2 and 3. The untreated composite was calcined at 1000° F. for 16 hours before surface area measurement.

Table 2

| Composite | Percent NH₃ in NH₄OH Solution | Surface Area, Sq. M./Gm. |
|---|---|---|
| Untreated Composite | | 318 |
| Composite 1 | 1.85 | 279.4 |
| Composite 2 | 3.91 | 258.6 |
| Composite 3 | 6.17 | 242.5 |

These results indicate that other conditions being fixed, the extent of alteration of the surface characteristics is increased by increasing the concentration of NH₃ in the treating solution.

EXAMPLE III

This example is concerned with the effect of the ammonium hydroxide treatment on the properties of the commercial silica-alumina composite employed as the starting material in Example I in the catalytic cracking of petroleum oils. A portion (portion 3) of the composite was covered with an aqueous solution of ammonium hydroxide containing 28 percent NH₃ for 15 minutes at atmospheric temperature. After draining off the solution from the composite, it was dried at 248° F. overnight in a drying oven and was then calcined for 16 hours at 1400° F. Another portion (portion 4) was subjected to the same treatment, but was calcined at 1000° F. An untreated portion (portion 1) was calcined for 16 hours at 1400° F. Another untreated portion (portion 2) was similarly calcined but at 1000° F. These four portions were then tested for catalytic cracking properties in the following manner. Each portion was employed as a cracking catalyst by passing a Mid-Continent gas oil having a 450°–650° F. boiling range over the portion at a space velocity (volume of gas oil per volume of catalyst per hour) of 1.0 for one hour. The results obtained in the tests are given in Table 3.

Table 3

| Portion of Composite | NH₄OH Treatment | Calcination Temp., °F. | Gasoline, Wt. Percent Charge | Gas plus Coke, Wt. Percent Charge | Gasoline/Gas+Coke Ratio |
|---|---|---|---|---|---|
| Portion 1 | No | 1,400 | 30.6 | 13.3 | 2.3 |
| Portion 2 | No | 1,000 | 32.0 | 13.5 | 2.37 |
| Portion 3 | Yes | 1,400 | 26.8 | 8.6 | 3.12 |
| Portion 4 | Yes | 1,000 | 27.7 | 14.4 | 1.92 |

It will be seen from these results that although under the conditions employed the activity of the catalyst with respect to formation of gasoline is reduced by the ammonium hydroxide treatment, the selectivity of the catalyst calcined at the higher temperature has been improved since the decrease in gas plus coke production is greater proportionately than the decrease in gasoline production. Inasmuch as in many catalytic cracking plants the factor limiting the charging capacity of the plant is the amount of coke deposited on the catalyst that can be burned per unit time, and the gas produced is less useful than gasoline, the catalyst of portion 3 has valuable properties.

Although the cracking operation described in Example III is a fixed bed operation, the treated silica-metal oxide composites can also be employed in the other types of catalytic cracking processes with equal advantage.

It will be understood that the foregoing examples are merely illustrative of the invention and that similar results can be obtained by treating in the same or similar ways, other members of the class of calcined silica-metal oxide composites.

The description has stressed that the composites with which the invention is concerned are calcined materials. This is important since prior to the time such a composite is calcined, it is more or less unstable and even in the absence of specific treatment, it is subject to changes. Since the present process is designed to effect controlled alterations in the surface characteristics in the composite subjected to treatment, it is important that the composite have fixed chemical and physical properies. Calcination involves heating the material to a high temperature, for example, a temperature of 700° F. to 1300° F., ordinarily, a temperature within the range of 800° to 1200° F. for a time sufficient to fix the characteristics of the composite, usually a period of from 15 minutes to 20 or more hours, depending upon the temperature and the specific characteristics of the composite.

In place of the aqueous solution of ammonium hydroxide employed in the above examples, there may be used an aqueous solution of a water-soluble substituted ammonium hydroxide, such as a hydroxide of a primary, secondary or tertiary amine, or a quaternary ammonium hydroxide. It is preferred to employ substituted ammonium hydroxides of this class in which the substituents are lower alkyl groups, such as alkyl groups containing not more than six carbon atoms. As examples of such compounds there may be mentioned mono-, di-, tri-, and tetra-methyl, ethyl, propyl or butyl ammonium hydroxide. It will be understood that the N-substituents in these compounds need not be identical as such compounds as methylethyl ammonium hydroxide, and ethyl-butyl ammonium hydroxide can be used.

Those skilled in the art will recognize from the foregoing description that the time of contact between the ammonium hydroxide and the inorganic composite can be varied widely depending upon the degree of alteration desired, the concentration of the ammonium hydroxide solution, the temperature and the specific nature of the composite subjected to treatment. Therefore, it is not possible to state a time range which would be optimum for all applications of the process. For example, when using elevated temperatures, alteration of the surface characteristics of the composite can be obtained in a few seconds. On the other hand, under mild condition of operation, the composite can remain immersed in the ammonium hydroxide solution for one or more hours.

Obviously many modifications and variations of the invention, as hereinbefore set forth, may be made without departing from the spirit or scope thereof and therefore only such limitations should be imposed as are indicated in the appended claims.

I claim:

1. A process of cracking a petroleum oil which comprises contacting said oil at cracking conditions with a silica-alumina cracking catalyst composite prepared by a process comprising immersing a calcined silica-alumina cracking catalyst composite in an aqueous solution of ammonium hydroxide, removing ammonium hydroxide from said composite, and then calcining said composite at a temperature of about 1400° F.

2. A process of preparing a silica-alumina composite which comprises mixing a soluble silica composition containing an alkali metal with a solution of a soluble salt of aluminum, coprecipitating silica hydrogel and alumina hydrogel to form a composite, removing alkali metal ions from the coprecipitated composite, pelleting and drying the composite, calcining the dried composite at a temperature of at least 700° F., immersing said composite in an aqueous solution of an ammonium hydroxide, removing the ammonium hydroxide from the composite, and calcining the composite at a temperature of about 1300° to 1500° F.

3. A process of treating a calcined silica-alumina composite consisting essentially of a predominant amount of silica and a minor amount of alumina, said process comprising immersing the composite in an aqueous solution of ammonium hydroxide, separating the composite from the ammonium hydroxide solution, removing ammonium hydroxide from the composite by drying, and calcining the resulting dried product at a temperature of about 1400° F.

References Cited in the file of this patent

UNITED STATES PATENTS

| | | |
|---|---|---|
| 2,412,868 | Brown | Dec. 17, 1946 |
| 2,484,258 | Webb et al. | Oct. 11, 1949 |